Dec. 7, 1954      E. A. BODKIN      2,696,462
METHOD FOR REGULATING THE FLOW OF SOLID ADSORBENTS
Filed April 8, 1952      2 Sheets-Sheet 1
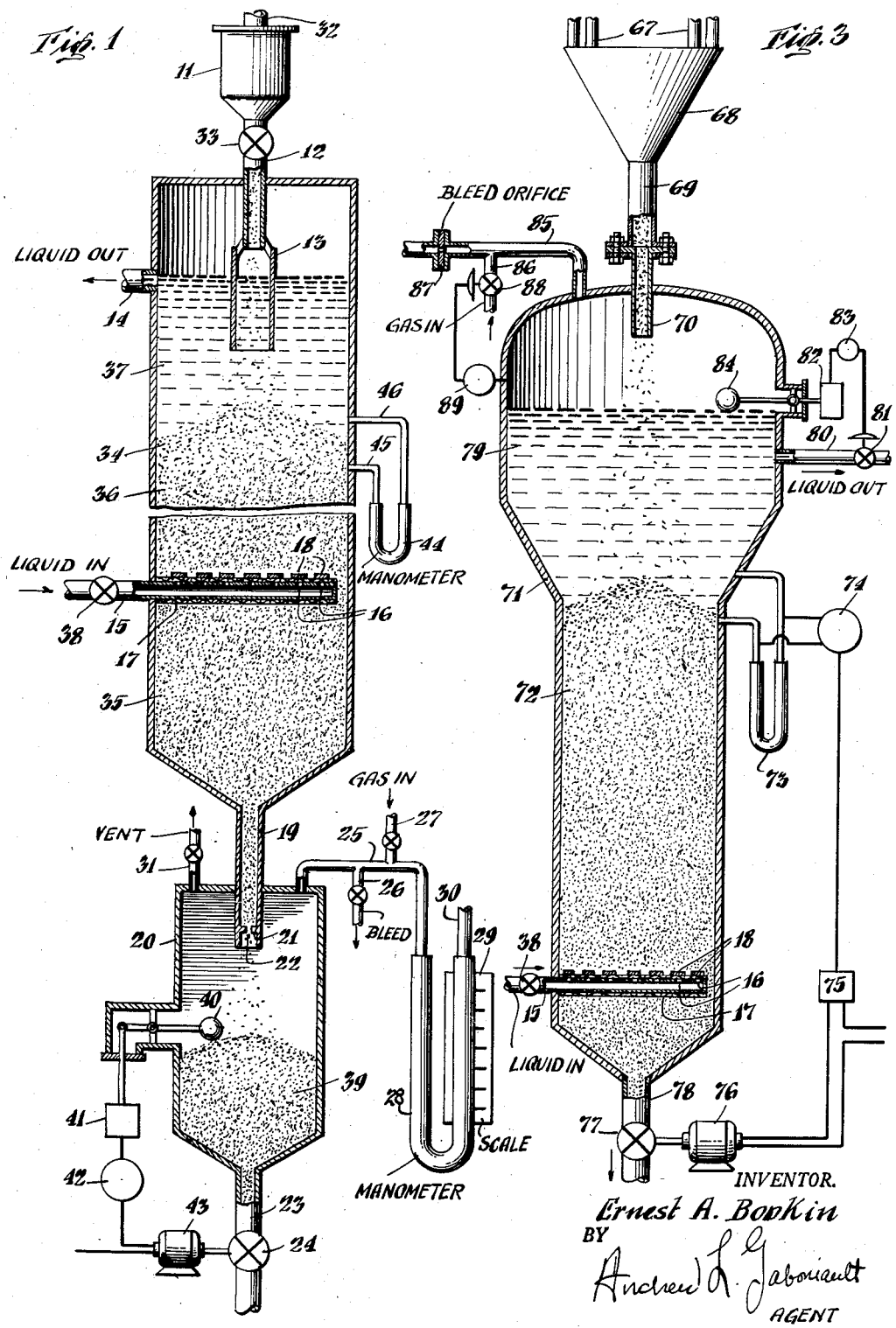

Dec. 7, 1954   E. A. BODKIN   2,696,462
METHOD FOR REGULATING THE FLOW OF SOLID ADSORBENTS
Filed April 8, 1952   2 Sheets-Sheet 2
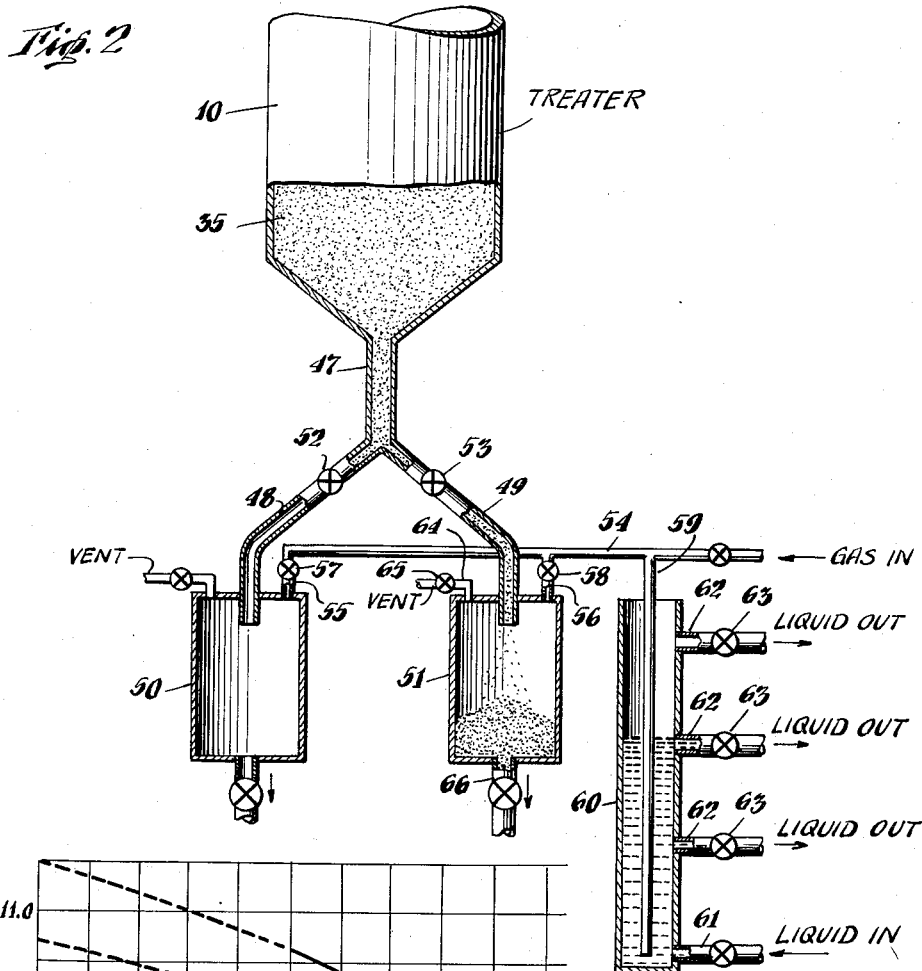
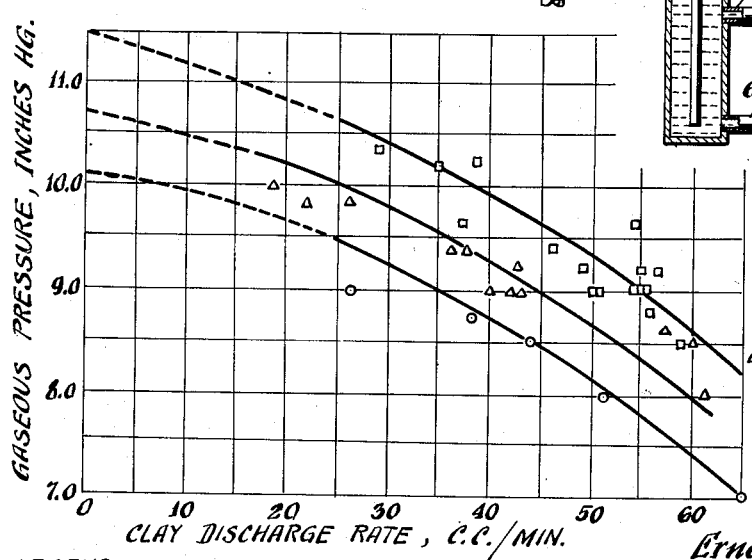
LEGEND:
○──○ 1.4 - 1.5 FT. EXPANDED BED
△──△ 4.5 - 5.5 "   "   "
□──□ 9.5 - 10.0 "   "   "
INVENTOR.
Ernest A. Bodkin
BY
Andrew L. Gaboriault
AGENT

United States Patent Office 2,696,462
Patented Dec. 7, 1954

2,696,462

METHOD FOR REGULATING THE FLOW OF SOLID ADSORBENTS

Ernest A. Bodkin, Wenonah, N. J., assignor to Socony-Vacuum Oil Company, Incorporated, a corporation of New York Application April 8, 1952, Serial No. 281,126

7 Claims. (Cl. 196—147)

This invention relates to a process for treating liquids, particularly liquid hydrocarbons, such as lubricating oils and lower-boiling petroleum fractions, which are of low asphalt content, with solid adsorbents for the purpose of removing small amounts of impurities or undesirable contaminants therefrom. It is also applicable to processes for washing and treating adsorbents to recover liquid materials therefrom, to processes for separation of liquid materials by adsorption, and to solvent extraction processes and the like involving contacting of liquid hydrocarbons with a solid adsorbent material.

Typical of the oil treating processes with which this invention is particularly concerned are decolorization, neutralization, removal of suspended colloidal or dissolved impurities such as carbon, coke or oxygen and nitrogen-containing impurities and other gum-forming compounds and improvements of demulsibility properties of the oil.

Recently there has been developed a continuous percolation method which is applicable to processes of the kind above-mentioned. In the continuous percolation process an adsorbent of palpable particle form is caused to move downwardly as a columnar mass through a confined treating zone countercurrently to the liquid hydrocarbons being treated. A carbonaceous contaminant is deposited on the adsorbent which reduces its treating efficiency. The spent adsorbent is passed through oil separation, washing, drying and burning steps and then recycled at the proper treating temperature to the treating zone. Oil recovered from the spent adsorbent is recycled to the treater. This process is the subject of claims in application Serial Number 177,408, filed in the United States Patent Office on August 3, 1950. This invention deals particularly with a method and apparatus for withdrawing wet adsorbent from the treater and washer portions of the continuous percolation process.

It is necessary in processes of the aforementioned types to provide some method of withdrawing adsorbent from the lower section of the columnar mass of adsorbent at a constant rate so that at all times the desired adsorbent to oil ratio may be maintained within the contacting zone or washing zone. Ordinary mechanical devices, such as ordinary valves, are frequently not satisfactory because the wet adsorbent tends to plug in these devices, at the desired flow rates, and interrupt the flow therethrough. Also large amounts of liquid have been found to escape with the adsorbent through the liquid outlet when such devices are used. It is also necessary in these processes to provide a means of withdrawal which achieves a uniform withdrawal of adsorbent across the entire cross-section of the contacting zone so as to avoid channeling of adsorbent therethrough which results in non-uniform contacting of adsorbent and liquid in the zone.

A major object of this invention is the provision in a process for effecting countercurrent contacting between a liquid and a downwardly moving adsorbent of palpable particulate form of an improved method for withdrawing adsorbent from the lower section of the columnar mass thereof which overcomes the above-described difficulties.

Another object of this invention is the provision of an improved method for treating liquid hydrocarbons countercurrently with a downwardly moving columnar mass of adsorbent particles.

A specific object is the provision of a method for continuous withdrawal of wet adsorbent from the lower section of a columnar mass thereof in a continuous percolation treater by which the rate of adsorbent withdrawal may be adjustably controlled while avoiding excessive withdrawal of liquid hydrocarbons with the adsorbent.

These and other objects of the invention will become apparent from the following description.

In the method of this invention adsorbent of palpable particulate form is passed downwardly through a contacting zone as a columnar mass and liquid charge is passed upwardly therethrough to effect the desired treatment. The spent adsorbent, together with some liquid adhering to the adsorbent, is passed from the lower section of the contacting zone downwardly through a confined settling zone below the level of liquid inlet to the columnar mass. Adsorbent and adhering liquid are withdrawn from the lower section of the settling zone and pass through at least one restricted passage into a confined receiving zone. Adsorbent and liquid drop from the restricted passage onto an accumulation thereof in the receivnng zone, the upper surface of the accumulation being maintained below the restricted passage by removing adsorbent and liquid from the lower section of the receiving zone. A gaseous pressure is maintained in the upper section of the receiving zone and this pressure is regulated to regulate the discharge of adsorbent through the restricted passage, the pressure being decreased to increase the adsorbent flow and increased to decrease the adsorbent flow.

In conducting this method the adsorbent employed should be made up of palpable particles of size within the range about 4–100 mesh and preferably about 10–60 and still more preferably 15–30 mesh by Tyler standard screen analysis. The particles may take the form of pellets, capsules, pills, spheres or the like or granules of irregular shape such as are obtained from grinding and screening. The terms "adsorbent in palpable particulate form" and "palpable particle form adsorbents" as employed herein in describing and in claiming this invention are intended to generically cover particles of any or all of these shapes having substantial size as distingushed from finely divided particles. The pore structure of the preferred adsorbents is such that while micropores are present, substantially more than 30 per cent of the pore volume and preferably more than 60 per cent of the total pore volume is occupied by macropores (i. e., pores having radii greater than 100 Angstrom units). Typical adsorbents which may be employed are fuller's earth, bauxite, bentonite and bone char, charcoal, magnesium silicate, heat and acid activated kaolin, and activated carbon. Synthetic silica or aumina or silica-alumina gel adsorbents and the like may be employed but preferably the preparation thereof should be controlled to provide a pore structure similar to that of the clay type adsorbents wherein substantially more than 30 per cent of the total pore volume is occupied by macropores. Gels of this type are described in United States Patent No. 2,188,007, issued January 23, 1940. It should be understood, however, that by proper control of the operation conditions, adsorbents of the synthetic gel type or otherwise, having mostly micropores and less than 30 per cent macropores, may be employed in the process of this invention although with somewhat inferior results when used for lubricating oil purification. On the other hand, gels of this latter type have been found to give superior results in the treatment of distillate fuel oils by the method of this invention. Such adsorbents of this latter type are disclosed in United States Patents Nos. 2,384,946 and 2,106,744. The invention in its broadest form is intended to be applicable to adsorbents of this type as well as the preferred adsorbents of larger pore structure.

This invention may be most readily understood by reference to the attached drawings of which:

Figure 1 is an elevational view, partially in section, of one form of this invention, Figures 2 and 3 illustrate modified forms of this invention and, Figure 4 is a graph illustrating the effect of the pressure differential across the restricted adsorbent withdrawal passage on the flow rate therethrough for one adsorbent.

All of these figures are diagrammatic in form and like parts in all bear like numerals.

Turning to Figure 1 there is shown therein a treating vessel 10 adapted to the countercurrent percolation of liquid hydrocarbon oils through a columnar mass of adsorbent of palpable particulate form. An adsorbent supply hopper 11 is positioned above vessel 10 and a conduit 12 extends from the lower section of hopper 11 into the upper section of vessel 10. Attached to the lower end of conduit 12 is an open topped soaking tube 13. A liquid product withdrawal conduit 14 extends from vessel 10 at a level intermediate the levels of the top and bottom of soaking tube 13. A plurality of uniformly distributed liquid feed conduits 15 extend laterally into vessel 10 at an intermediate level in the vessel. Only one of conduits 15 is visible in Figure 1. Conduits 15 contain orifices 16 on their upper sides so arranged that liquid will be distributed uniformly across vessel 10. A screen 17 is wrapped around each of pipes 15 and a button type baffle 18 is welded above each of orifices 16. This liquid feed device is the subject of claims in U. S. patent application 237,266, filed July 17, 1951. A conduit 19 extends from the lower section of vessel 10 into the upper section of a receiving chamber 20 and has an orifice plate 21 with orifice 22 therethrough fixed in its lower section. A withdrawal conduit 23 extends from the bottom vessel 20 and has motor controlled valve 24 therein. A gas supply conduit 25 extends into the upper section of vessel 20 and is equipped with a bleed line 26 and a line 27 connecting to a suitable source of gas pressure. A manometer 28 with a scale 29 thereon is connected to the outer end of 25 and vented to the atmosphere by conduit 30. A vent line 31 is provided on vessel 20.

In operation, fresh adsorbent at a suitable treating temperature is supplied to hopper 11 continuously through conduit 32 and gravitates therefrom into the upper section of vessel 10 through passage 12 at a rate controlled by valve 33. Vessel 10 is divided into a contacting or treating zone 34 lying above the level of liquid inlet through passages 15 and a settling zone 35 below the liquid inlet level. Within the contacting zone is a columnar mass of adsorbent 36 with a body of treated liquid oil 37 thereabove. Liquid oil charge is supplied to the lower section of the columnar mass of adsorbent 36 from passages 15 through orifices 16 and flows upwardly through the mass at a rate, controlled by valve 38, which is below the velocity which will disrupt the columnar mass 36 and cause non-uniform contacting. By this means oil purification and decolorization are effected. The treated liquid hydrocarbon passes upwardly through zone 37 wherein entrained adsorbent settles out and the liquid is removed through passage 14. Fresh, dry adsorbent drops from conduit 12 into soaking tube 13 which extends under the body of liquid 37. The adsorbent particles settle freely through the liquid in the soaking tube so that the adsorbent is wetted with oil and entrained gas is displaced therefrom and caused to escape out the top of tube 13. Adsorbent is discharged from the lower end of the tube and drops onto the upper surface of columnar mass 36 which is maintained below the lower end of tube 13 as will be described hereinbelow. Adsorbent gravitates through columnar mass 36 and is withdrawn from the lower section thereof into the upper section of settling zone 35 which extends from the level of liquid inlet downward to the level of orifice plate or reducing nozzle 21. The adsorbent passing to the settling zone will be spent and some liquid oil will be occluded therein. The adsorbent gravitates through zone 35 as a substantially compact column and is passed with occluded liquid from the lower end of zone 35 through the restricted passage 22 in orifice plate (or reducing nozzle) 21 into the upper section of receiving zone 20. Settling zone 35 permits the adsorbent to settle out of the liquid oil from contacting zone 34, the liquid oil being displaced upwardly, thereby decreasing the amount of liquid oil lost through passage 22. Zone 35 should be of sufficient height to prevent excessive oil from being forced downwardly through the zone at the pressure drop due to upward flow of oil through columnar mass 36 in treating zone 34. Adsorbent and occluded liquid oil drop from passage 22 onto the upper surface of an accumulation thereof 39 in zone 20. The surface level of accumulation 39 is maintained below passage 22 by withdrawing adsorbent through passage 23 at rates controlled by valve 24 in response to a float 40 on the surface of accumulation 39. Float 40 actuates motor control instruments 41 and 42 which in turn operate motor 43 to open and close valve 24 and thereby increase or decrease the flow through passage 23. A gaseous pressure is maintained in the upper section of receiving zone 20 by means of gas such as air, nitrogen, flue gas or the like, supplied through conduit 25. The gaseous pressure in receiver 20 is then regulated to regulate the flow through passage 22, the flow increasing as the pressure is decreased and decreasing as the pressure is increased. This regulation is made as required to keep the surface level of columnar mass 36 substantially constant. The position of the surface level of columnar mass 36 is indicated by manometer 44 which connects to pressure taps 45 and 46 arranged at vertically spaced apart levels shortly above and below the desired column surface level. If the column surface level starts to rise the pressure indicated by manometer 44 will increase and if the surface level falls the indication of manometer 44 will decrease. The gaseous pressure in receiving zone 20 is then decreased or increased to increase or decrease the rate of adsorbent withdrawal through passage 22. This regulation of the pressure in 22 may be accomplished by regulating the amount of gas introduced at 27, or by regulating the amount bled off through 26 or by regulating the amount vented through passage 31. This regulation is possible because of the surface tension effect across passage 22 which arises because of the gas bubble or gas-liquid interface across 22. The flow of adsorbent may be completely stopped by maintaining a pressure below 22 equal to the effective calculable static head above the passage. This effective calculable static head is equal to the head of liquid above passage 22, that is the weight of a column of liquid of the type being treated of unit area and of a height equal to the distance between passage 22 and liquid outlet 14, plus the weight of a column of adsorbent of unit area and of a height equal to the distance between the liquid inlet at the level of orifices 16 and the upper surface of columnar mass 34. The weight of the adsorbent in columnar mass 34 enters the computation because the columnar mass is in an expanded condition due to the flow of liquid therethrough so that it exerts a pressure as if it were suspended in the liquid, although individual particles are not sufficiently disengaged from each other to permit their internal motion in the mass 34. The calculable static head may be slightly higher than determined by the above method due to the small amount of pressure exerted by the compact column of adsorbent in settling zone 35. This pressure is normally so small, however, that it may be ignored for practical purposes. When the flow of liquid through the contacting zone 34 is downward, the effective static head above passage 22 is equal to the weight of a column of liquid flowing of unit area and of a height equal to the distance between passage 22 and liquid inlet at the top of vessel 10.

What is actually regulated, then, in the method of this invention is the pressure differential between the effective calculable static head above passage 22 and the gaseous pressure in receiving chamber 20 exerted on the under side of 22; the greater the differential the greater the flow through 22. The gaseous pressure in 20 should not exceed the calculable static head above 22 by any substantial amount or the surface effect across 22 will be destroyed and gas will bubble upwardly through vessel 10.

Because effective regulation depends on the surface tension effect the area of passage 22 should not be so large that the surface effect is lost and gas bubbles in one side of the passage while liquid comes out the other. For this same reason the accumulation 39 of adsorbent and liquid should not be allowed to rise above passage 22 because there would be no gas liquid interface and flow through 22 could not be stopped although it might be regulated to a certain extent. Passage 19 might extend below the surface of accumulation 39 if restricted passage 22 were maintained above the surface and means for allowing gas entry to the under side of 22 from the upper section of zone 20 were provided above the surface of 39 but below passage 22.

Figure 2 illustrates an alternate form of apparatus in which the method of this invention may be used. A conduit 47 extends downwardly from the bottom of contacting vessel 10 and branches out into two conduits of restricted area, 48 and 49 which terminate in the upper section of separate receivers 50 and 51 respectively.

Valves 52 and 53 are provided in lines 48 and 49, respectively. Gaseous material supply conduit 54 connects to a suitable gas source (not shown) and conduits 55 and 56 with valves 57 and 58, respectively, connect conduit 54 with the upper section of receivers 50 and 51, respectively. A bleed line 59 also extends from 54 before conduits 55 and 56 into the lower section of an open topped regulating chamber 60. Chamber 60 is provided with a liquid inlet 61 in its lower end and a plurality of liquid outlet 62 vertically spaced apart along chamber 60 above inlet 61 and having valves 63 thereon.

In operation only one of restricted passages 48 and 49 is opened at a time. Thus, in Figure 2, valve 52 is closed while valve 53 is open and adsorbent gravitates from the lower section of settling zone 35 through passage 47 and restricted passage 49 into the upper section of receiving zone 51. A source of gas pressure above the calculable static head above the lower end of passage 53 is maintained exterior to the system and gas passes therefrom through passages 54 and 56 into the upper section of receiving zone 51. Valve 57 is kept closed during this time. A portion of the gaseous material flowing in 54 is passed into the lower section of regulating zone 60. A suitable liquid, such as water, is passed into the lower section of zone 61 and is removed through one of passages 62. The particular passage 62 which is used to draw off the liquid is chosen so that there will be a column of liquid above the lower end of passage 59 where gaseous material enters zone 60 which is equal to the pressure required in receiving zone 51 to maintain the rate of discharge of adsorbent and liquid hydrocarbons from the lower end of restricted passage 49. Thus, sufficient gas to reduce the pressure in line 54 to the static head of liquid in zone 60 will bubble up through the liquid in zone 60 and the gas supplied to the receiving zone 51 will be at the desired pressure. Changes in flow rate can be effected by changing the particular conduit 62 through which liquid is withdrawn. This may not be entirely adequate to maintain some rates of flow since there can be only a limited number of conduits 62. So where the flow rate desired requires a gaseous pressure equal to a head of the liquid in zone 60 which would lie between two of passages 62, the one of the passages which gives a head which is immediately above the gaseous pressure desired should be used and final adjustment made by venting a portion of the gas from receiver 51 through passage 64 at a rate controlled by valve 65 to give the desired pressure in zone 51.

Adsorbent and liquid oil drop from restricted passage 49 into receiving zone 51 and are allowed to accumulate therein. Before the accumulation in 51 reaches the lower end of passage 49 valves 53 and 58 are closed and at substantially the same time valves 52 and 57 are opened. Adsorbent and occluded liquid oil then flow through restricted passage 48 into receiver 50. The flow from passage 48 is controlled by the gaseous pressure in the upper section of zone 50 in the same manner as the flow from passage 49 was controlled. Gaseous material is supplied through passages 54 and 55. While zone 50 is filling with adsorbent and liquid oil, zone 51 is emptied through conduit 66. The flow of adsorbent and liquid oil may then be returned to zone 51, zone 50 being emptied while 51 is filling.

The use of the method of this invention to transfer adsorbent from the treating zone directly to a washing zone wherein the liquid oil adhering to the adsorbent may be removed is shown in Figure 3. Conduits 67 transport adsorbent from the contacting zone into a funnel shaped collector 68. Adsorbent passes from the lower end of collector 68 through a passage 69 and then through a restricted passage 70 into the upper section of a confined washing zone 71. A downwardly gravitating columnar mass of adsorbent 72 is maintained within the lower section of washing zone 71 and a suitable washing solvent, such as naphtha, is supplied to the lower section of columnar mass 72 by a liquid feed device similar to that shown for the liquid charge to the treating zone of Figure 1. The surface level of 72 is controlled within a fixed range in response to indications of pressure drop on manometer 73. The manometer operates to determine the level of 72 as described in connection with Figure 1. Instruments 74 and 75 are actuated in response to manometer 73 and operate motor 76 which in turn opens or closes valve 77 to increase or decrease the withdrawal of adsorbent through passage 78 as required. This method of level control is described and claimed in U. S. patent application 237,189, filed July 17, 1951. If desired the adsorbent withdrawal system of this invention may be used at the lower end of the washing zone. A column of used liquid solvent 79 is maintained above columnar mass 72 of sufficient height to allow adsorbent to settle from the solvent. The upper section of washing zone 71 is preferably expanded to provide for a reduced liquid velocity in column 79 and, therefore, more efficient settling. Liquid solvent with dissolved oil is withdrawn through passage 80. The upper surface of liquid solvent column 79 is controlled at a level below the lower end of restricted passage 70 but above withdrawal passage 80. Thus, no gaseous material can escape from the space above column 79 through 80 and column 79 is kept out of contact with the lower end of 70 so as not to interfere with the gas-liquid interface there. The surface level is controlled by operating diaphragm valve 81 in passage 80 in response to instruments 82 and 83 which are actuated by float 84 on the surface of 79. A suitable gaseous material is passed through conduit 86 into conduit 85 which connects into the space above column 79 in washing zone 71. A portion of the gas is bled off through bleed orifice 87 in line 85 while the remainder passes into zone 71. The gaseous pressure above column 79 is maintained at a level suitable to effect the desired flow rate from the treating zone through restricted passage 70 as previously described. This pressure level is maintained by operating diaphragm valve 88 on gas inlet 86 in response to pressure regulator 89.

The various parts of an apparatus capable of using the method of this invention may, of course, take different forms than those shown and described. The invention does have three essential elements, however, a settling zone below the liquid inlet to contacting zone, a restricted passage which is not of an area and shape such that the surface tension effect at the surface is lost and gas flows in one side and liquid and solids out the other and a gas space between the restricted passage and the accumulation of liquid and adsorbent in the receiving zone so that a gas-liquid interface may be formed at the restricted passage.

The settling zone or space, as previously stated, should be of sufficient height to prevent excessive oil from being forced down through the settling zone. The settling zone should have a height equal to at least ten times the diameter of the restricted passage and usually should be of a height within the range 1 to 10 feet. The height of the settling space also acts to provide uniform adsorbent removal from the contacting zone at the level of the oil inlet by overcoming the effect of the localized draw-off from the settling zone. The vertical downward velocity of adsorbent through the settling zone should preferably be less than about 0.13 feet per second though in some applications it may be higher.

The restricted passage may consist of an orifice fixed in a larger passage as shown in Figure 1 or it may be a passage of substantial length as shown in Figures 2 and 3 so as to take the form of a nozzle. The minimum lateral dimension or diameter should not be less than about 3 times the diameter of the largest adsorbent particles. As previously stated the dimensions of the restricted passage should not be so great that a gas liquid interface cannot be formed there. It has been found that circular pipes of 1 or 2 inches in diameter are satisfactory. Generally the restricted passage used should have a hydraulic radius less than about 0.75 inches and preferably less than about 0.50 inches. The restricted passage may take any desired cross-sectional shape but a circular passage is preferred. For larger flow rates a plurality of restricted passages from the settling zone may be used.

Figure 4 is a graph showing the gaseous pressure that must be exerted on the under side of a restricted passage tapered down to a 10 millimeter diameter at its lower end to regulate the flow of adsorbent therethrough. The three curves therein are for the following height of adsorbent columnar masses or beds above the liquid inlet:

| Curve | Settled Bed | Expanded Bed |
| --- | --- | --- |
| Upper | 5 to 5.5 feet | 8.5 to 9.5 feet |
| Middle | 3 feet | 4.5 to 5.5 feet |
| Lower | 11 inches | 1.4 feet |

The settled bed height is the bed height with no liquid charge flowing upwardly therethrough so that the bed is in a substantially compact condition. The expanded bed condition is the height of the bed during the treating operation with oil flowing upwardly therethrough. The adsorbent used to obtain this data was a 30–60 mesh Tyler fuller's earth having a dry density of about 32 pounds per cubic foot. The oil used had a viscosity of 5 cp. at 85° F. and a density of 50 to 52 pounds per cubic foot. The volume ratio of liquid oil at 60° F. to adsorbent (packed density) was about 6 within the treating zone for all runs. A column of treated liquid of about 12 inches and a settling zone below the liquid inlet of a height of about 22 inches were provided in all runs. The curves of Figure 4 illustrate that the rate of adsorbent withdrawal decreases with increasing pressure on the restricted passage and that the pressure needed varies with the effective static head above the restricted passage.

The operating conditions within the contacting zone when purifying or decolorizing hydrocarbon oils may involve temperatures within the range of atmospheric to 700° F. and pressures near or moderately below or in excess of atmospheric pressure. The relative amounts of adsorbent and liquid oil feed passed through the treater depend upon the degree of decolorization or other treatment desired. In general, the volumetric ratio of liquid oil measured at 60° F. to adsorbent (packed density) falls within the range 0.3 to 30.

The superficial velocity of liquid oil through the treater should be within the range ½–20 feet per hour and preferably within the range 1–10 feet per hour (based on oil at treating temperature and free cross-sectional area of treater when empty). In all cases, the oil velocity should be controlled below that which would interfere with the downward direction of flow of the adsorbent particles. While some expansion in the columnar mass due to oil flow may be tolerated, oil velocities should be avoided which are so high as to cause the adsorbent particles to move upwardly through the treating zone since such high velocities would prevent true countercurrent contacting of the oil and adsorbent with resultant decrease in the efficiency of the treating process.

The vertical length of the adsorbent column in the treating zone should be greater than about 3 feet and preferably from 10–50 feet. If desired, the invention may be applied to the adsorbent washing step of the continuous percolation process wherein occluded oil is washed from a down-flowing column of adsorbent by means of an upwardly percolating solvent such as petroleum naphtha, carbon tetrachloride, carbon disulfide or normal heptane. In general, the same limits discussed hereinabove apply to the washing step except that the operating temperature may be somewhat lower.

It is intended to cover herein all changes and modifications of the examples of this invention herein chosen for purposes of disclosure which do not constitute departures from the spirit and scope of the invention.

I claim:

1. In a process for the countercurrent contacting of liquid and adsorbent wherein the liquid flows upwardly through a downwardly gravitating columnar mass of adsorbent of palpable particulate form, the method for withdrawing adsorbent from the lower section of the columnar mass at controlled rates which comprises: passing adsorbent and some liquid occluded thereto downwardly through a confined settling zone below the level of liquid inlet to said columnar mass, passing adsorbent and occluded liquid from the lower section of said settling zone through at least one passage of restricted area, dropping adsorbent and liquid from said restricted passage onto an accumulation thereof in a confined receiving zone, said accumulation being below the level of the lower end of said restricted discharge passage, removing adsorbent and liquid from the receiving zone so as to keep the level of the accumulation thereof below the restricted discharge passage, maintaining a gaseous pressure in the upper portion of said receiving zone and regulating said pressure to regulate the rate of adsorbent discharge from said settling zone through said restricted passage, the pressure being increased when adsorbent flow is to decrease and decreased when adsorbent flow is to increase.

2. In a process for the countercurrent contacting of liquids and adsorbent of palpable particulate form wherein the liquid flows upwardly through a downwardly gravitating columnar mass of the adsorbent, the method for withdrawing adsorbent from the lower section of the columnar mass at controlled rates which comprises: passing adsorbent and some liquid occluded thereto downwardly through a confined settling zone below the level of liquid introduction to said columnar mass, passing adsorbent and occluded liquid from the lower section of said settling zone through at least one passage of restricted area, dropping adsorbent and liquid from said restricted passage onto an accumulation thereof in a confined receiving zone, said accumulation being below said restricted passage, removing adsorbent and liquid from the receiving zone so as to keep the level of said accumulation below the restricted passage, maintaining a gaseous pressure in the upper portion of said receiving zone and controlling the rate of discharge of adsorbent through said restricted passage by controlling the pressure differential between the calculable static head above the discharge end of said restricted passage and the gaseous pressure below said restricted passage in said receiving zone.

3. In a process for the countercurrent contacting of liquid hydrocarbons and adsorbent of palpable particulate form wherein the liquid hydrocarbons flow upwardly through a downwardly gravitating columnar mass of adsorbent, the method for withdrawing adsorbent from the lower section of the columnar mass at controlled rates which comprises: passing adsorbent and some liquid hydrocarbons occluded thereto from the lower end of said columnar mass into a confined settling zone below the liquid inlet to said columnar mass, gravitating adsorbent and liquid through said settling zone and withdrawing a stream of adsorbent and liquid from the lower end thereof, passing said stream of adsorbent and liquid through a first restricted passage into the upper section of a first confined receiving zone, discharging adsorbent and liquid from said first restricted passage into said first receiving zone, regulating the gaseous pressure in said first receiving zone so as to regulate the rate of adsorbent discharge through said first restricted passage, accumulating adsorbent and liquid in said first receiving zone, closing off the flow through said first restricted passage before the accumulation of adsorbent and liquid reaches the level of said restricted passage and at substantially the same time opening flow of adsorbent and liquid from the lower end of said settling zone through a second restricted passage into the upper section of a second receiving zone, regulating the rate of discharge of adsorbent from said second restricted passage by regulating the gaseous pressure in the upper section of said second receiving zone, accumulating adsorbent and liquid in said second receiving zone, removing adsorbent and liquid from said first receiving zone during the accumulation thereof in said second zone, returning the flow of said liquid and adsorbent to said first restricted passage before the level of adsorbent and liquid in said second receiving zone reaches the level of the lower end of said restricted passage and removing adsorbent and liquid from said second receiving zone while adsorbent and liquid are accumulating in said first receiving zone.

4. In a process for the countercurrent contacting of liquid hydrocarbons and adsorbent of palpable particulate form wherein the liquid hydrocarbons flow upwardly through a downwardly gravitating columnar mass of adsorbent, the method for withdrawing adsorbent from the lower section of the columnar mass at controlled rates which comprises: passing adsorbent and some liquid hydrocarbons occluded thereto from the lower end of said columnar mass into a confined settling zone below the liquid inlet to said columnar mass, gravitating adsorbent and liquid through said settling zone and withdrawing a stream of adsorbent and liquid from the lower end thereof, passing said stream of adsorbent and liquid from the lower end of said settling zone through a confined passage of restricted area into the upper section of a confined receiving zone, dropping adsorbent and liquid from the restricted passage onto an accumulation thereof in said receiving zone, removing adsorbent and liquid from said receiving zone to maintain the level thereof in the receiving zone below the restricted portion of said passage, maintaining a source of gaseous material to be supplied to said receiving zone at a pressure above the calculable static head above the restricted passage, passing a portion of said gaseous material from said source into the lower section of a confined regulating zone and passing the remainder of said gaseous material into said receiving zone to supply gaseous pressure thereto, maintaining a column of liquid material in said regulating zone of a height above the level where gaseous material is supplied thereto such that the pressure at said level due to the static head of liquid material above said level will be equal to the pressure required in said receiving zone to control the discharge of adsorbent from said restricted passage at the desired rate whereby the gaseous material is supplied to said receiving zone at the pressure required to maintain said rate and regulating the height of said column of liquid material to regulate the discharge of adsorbent from said passage.

5. A continuous process for the countercurrent contacting of liquid hydrocarbons with absorbents of palpable particulate form to remove small amounts of undesirable impurities from the hydrocarbons which comprises: supplying adsorbent to the upper section of a confined contacting zone and passing the adsorbent therethrough as a downwardly gravitating columnar mass of particles, passing the liquid hydrocarbons upwardly through the columnar mass at a velocity controlled below that which would interfere with the uniform downward flow of adsorbent particles, withdrawing the contacted liquid hydrocarbons from the upper section of said zone, passing adsorbent with some liquid hydrocarbons occluded thereto from the lower section of the columnar mass of adsorbent downwardly through a confined settling zone below the level of liquid inlet to said columnar mass, passing adsorbent through said settling zone as a substantially compact column, passing adsorbent and occluded liquid hydrocarbons from the lower end of said settling zone through a confined passage of restricted area into the upper section of a confined washing zone, passing adsorbent downwardly through the washing zone as a downwardly gravitating columnar mass and passing a washing solvent upwardly through the columnar mass to dissolve the liquid hydrocarbons occluded to the adsorbent, maintaining a column of washing solvent above the columnar mass of adsorbent in said washing zone, withdrawing washing solvent with dissolved hydrocarbons from the upper section of said column of solvent at a level substantially below the lower end of said restricted passage, controlling the surface level of said column of washing solvent so as to maintain said level below the lower end of said restricted passage but above the point of withdrawal of said solvent from the washing zone whereby a gaseous pressure may be maintained above said column, dropping adsorbent and liquid hydrocarbons from said restricted passage onto said liquid column and through said liquid column onto the upper surface of the columnar mass of adsorbent in the washing zone, regulating the flow of adsorbent through said restricted passage by regulating the gaseous pressure in the upper section of said washing zone above said column of solvent, said pressure being increased when said flow of adsorbent is to decrease and decreased when said flow is to increase.

6. In a process for the countercurrent contacting of liquid hydrocarbons and adsorbent wherein the liquid flows upwardly through a downwardly gravitating columnar mass of adsorbent of palpable particulate form, the method for withdrawing adsorbent from the lower section of the columnar mass at controlled rates which comprises: passing adsorbent and liquid hydrocarbons occluded thereto from said columnar mass downwardly through a confined settling zone as a substantially compact column, said settling zone being below the level of liquid inlet to said columnar mass, passing adsorbent and occluded liquid from the lower section of said settling zone through at least one restricted passage into the upper section of a confined receiving zone, maintaining the height of said settling zone at least ten times the diameter of said restricted passage, dropping adsorbent and liquid from said restricted passage onto an accumulation thereof in said receiving zone, said accumulation being below said restricted passage, removing adsorbent and liquid from said receiving zone so as to keep the level of the accumulation therein below said restricted passage, maintaining a gaseous pressure in the upper section of said receiving zone and controlling the rate of discharge of adsorbent through said restricted passage by controlling the pressure differential between the calculable static head above said restricted passage and the gaseous pressure below said restricted passage in said receiving zone, flow through said restricted passage increasing as said differential increases.

7. In a process for the continuous countercurrent contacting of liquid hydrocarbons and adsorbent wherein the liquid flows upwardly through a downwardly gravitating columnar mass of adsorbent of palpable particulate form, the method for withdrawing adsorbent from the lower section of the columnar mass at controlled rates which comprises: passing adsorbent with some liquid hydrocarbons occluded thereto from the lower section of said columnar mass into the upper section of a confined settling zone below the liquid inlet to said columnar mass, said settling zone being of a height of about 1 to 10 feet, passing adsorbent downwardly through said settling zone as a substantially compact column moving at a velocity less than about 0.13 feet per second, passing adsorbent and occluded liquid from the lower end of said settling zone through a restricted passage into a confined receiving zone, dropping adsorbent and occluded liquid from said restricted passage onto an accumulation of adsorbent and liquid in the receiving zone, maintaining the upper surface of said accumulation below the level of said restricted passage by withdrawing adsorbent and liquid from the receiving zone, maintaining a gaseous pressure in the upper section of said receiving zone, and regulating the flow of adsorbent through said restricted passage by regulating said gaseous pressure, the flow increasing as the gaseous pressure decreases and decreasing as the gaseous pressure increases.

References Cited in the file of this patent

UNITED STATES PATENTS

| Number | Name | Date |
| --- | --- | --- |
| 2,006,088 | Mitchell | June 25, 1935 |
| 2,448,257 | Evans | Aug. 31, 1948 |
| 2,470,339 | Claussen et al. | May 17, 1949 |
| 2,584,378 | Beam | Feb. 5, 1952 |